3,287,335
POLYMERIZATION OF OLEFIN WITH POLAR MONOMERS IN THE PRESENCE OF ZIEGLER TYPE CATALYST SYSTEMS
Dagobert Engelbert Stuetz, Metuchen, N.J., assignor to Celanese Corporation of America, New York, N.Y., a corporation of Delaware
No Drawing. Filed July 3, 1964, Ser. No. 380,992
10 Claims. (Cl. 260—86.7)

This application is a continuation of my copending application Serial No. 104,525, filed April 21, 1961, and now abandoned.

This invention relates to improved polymers of polar monomers and a process of making them.

It is known to polymerize ethylenically unsaturated polar monomers e.g., methyl methacrylate, by means of conventional free radical-yielding catalysts such as peroxides. Although these polymers are satisfactory for many purposes, it is desirable in some instances to obtain polymers of polar monomers which have improved mechanical properties, e.g. tenacity and improved optical properties. This improvement in properties enhances the utility of the polymer in many of its applications, e.g. film and sheet for wrapping and other purposes, molded articles and filaments for the manufacture of textiles. While certain new types of catalysts have been used to obtain hydrocarbon polymers of superior properties which possess a greater degree of stereospecificity, crystallinity and/or linearity, such catalysts often are not satisfactory for the polymerization of monomeric mixtures comprising a polar monomer because the polymerization goes forward very slowly or not at all so that little or no polymer is obtained, and/or the resulting polymer has inferior properties, e.g., low molecular weight as indicated by inherent viscosity.

It is an object of this invention to provide improved polymers of ethylenically unsaturated polar monomers. It is a further object of this invention to provide a polymer of polar compounds having improved mechanical and optical properties. It is a still further object of the invention to provide a process for making the foregoing polymers at relatively high rates of reaction. Other objects will be apparent from the following detailed description and claims.

In accordance with one aspect of the invention, an ethylenically unsaturated polar monomer is gradually contacted with a catalyst system comprising at least one component from each of the following catagories:

(I) A compound of at least one metal from Groups Ia or IIb of the Periodic Table (Mendeléeff) in which an atom of said metal is directly attached to a carbon atom and which preferably contains no other metal. Examples of contemplated compounds are the alkyls, aryls, and alkyl halides of lithium, sodium, potassium, beryllium and magnesium. A preferred group of compounds is the lithium alkyls wherein the alkyl groups contain from 1 to 6 and preferably from 4 to 6 carbon atoms.

(II) A compound of at least one metal of Group IIIb of the Periodic Table (Mendeléeff) in which an atom of said metal is directly attached to a carbon atom and which preferably contains no other metal, e.g., alkyls, aryls and alkyl halides of aluminum, gallium and indium such as aluminum trialkyls and triaryls or mixed alkylaryls. A preferred group of compounds is the aluminum trialkyls wherein the alkyl groups contain from one to six carbon atoms.

(III) As an oxidizing component, a compound of one or more transition heavy metals from Groups IVa, Va, VIa, VIIa or VIII of the Periodic Table (Mendeléeff) wherein said element has a valence above its most reduced state. The metal may be attached for example to a halide, oxyhydrocarbon, e.g. alkoxide, or oxide group. Some specific compounds are titanium tri- and tetrachloride, zirconium tetrabromide, chromyl chloride, chromyl acetate, vanadium trichloride and vanadium oxychloride. The oxidizing component may also be a compound having a homogeneous crystalline structure and a unique and characteristic X-ray diffraction pattern which is prepared by reacting aluminum metal with titanium tetrachloride in the presence of an organic solvent and, if desired aluminum chloride as a catalyst at a temperature of 80 to 220° C., as described in application Serial No. 791,261, filed February 5, 1959, by Stuetz, and now abandoned, and referred to in the latter application as the "titanium composition."

It has been found that with the polymerization catalyst system of this invention is is possible to obtain relatively high yields of polymers of superior properties, e.g., high melting points and inherent viscosities and which yield shaped articles such as films and filaments having improved mechanical and optical properties.

The polar monomer which is polymerized using the process of this invention may be, for example, a monoethylenically unsaturated non-hydrocarbon the molecules of which contain at least one atom with unshared electrons. More particularly, monoethylenically unsaturated compounds containing oxygen are contemplated as the polar monomer. A preferred group of polar comonomers are unsaturated esters, either of monoethylenically unsaturated carboxylic acids and saturated alcohols e.g., alkyl, acrylates and methacrylates wherein the alkyl groups contain for example 1 to 6 carbon atoms such as methyl methacrylate and ethyl acrylate, or esters of saturated carboxylic acids and unsaturated alcohols, e.g., vinyl esters of alkanoic acid wherein the acid contains from 1 to 18 carbon atoms, such as vinyl acetate. The preferred polar monomer is methyl methacrylate.

While the process of this invention may be used to homopolymerize the polar monomer or form copolymers of more than one polar monomer, in accordance with another aspect of the invention, the polar monomer is copolymerized with an ethylenically unsaturated hydrocarbon to form copolymers containing a relatively large amount of polymerized polar monomer. Thus, the process of this invention may be used to form copolymers of an ethylenically unsaturated hydrocarbon and a polar comonomer which contains more than 3.5 mol percent of polymerized polar monomer. A particularly useful group of copolymers, for example, are those containing 4 to 12 mol percent of polymerized polar comonomer, e.g. methyl methacrylate. Moreover, the process may be used to obtain polymers containing more or less than 3.5 mol percent of polar monomer at relatively high reaction rates and with relatively high yields. The hydrocarbon comonomer may be, for example, a monoethylenically unsaturated 1-olefin containing 2 to 8 carbon atoms. Some 1-olefins which may be polymerized are ethylene, propylene, butene-1, 3-methyl butene-1 and 4-methyl pentene-1. Mixtures of unsaturated hydrocarbons may also be copolymerized with the polar comonomer.

In carrying out the polymerization process the components of the catalyst are combined under agitation in the reactor and are contacted with the hydrocarbon comonomer if a copolymer of polar and hydrocarbon monomer is being prepared. This may be done in the presence of a solvent for the polymerization or without the addition of any solvent. Any solvent which dissolves or disperses but does not react with the catalyst components or the monomers may be used. Particularly suitable are the hydrocarbon solvents such as pentane, hexane, heptane, cyclohexane, toluene and benzene. The polar monomer is then gradually added, either as a solution in an inert solvent which may be the same or different than the polymerization solvent, or in pure, undilute form. If the polar monomer is added in the form of a solution in an inert solvent, the concentration of polar monomer in the solution may be, for example, 10 to 50% by weight. The polar monomer may be added to the reaction zone at a rate, for example, within the range of 0.01 to 1, preferably 0.03 to 0.5 millimole per millimole of oxidizing component per minute.

In general, substances such as oxygen and water which may unfavorably interfere with the polymerization are rigidly excluded from the system, e.g., through the use of the nitrogen blanket in the vapor space.

In some cases, hydrogen may be present in the system as a control on the inherent viscosity of the polymer obtained. The partial pressure of the hydrogen in the vapor space of the reaction zone may be, for example, up to 10% of the total pressure and up to 15% of the partial pressure of ethylene, if the polar monomer is being copolymerized with ethylene as an unsaturated hydrocarbon being copolymerized.

After the reaction has proceeded to the desired point it is interrupted and the polymer precipitated by adding to the mass a non-solvent for the polymer, e.g., methanol. The polymer is then separated and washed.

The process may be carried out batchwise wherein a monomer is reacted in an autoclave until the desired amount of polymer is produced after which the reaction is interrupted and the polymer precipitated or the process may be carried out continuously e.g. by sending streams of catalyst solvent and monomers into the bottom of the reactor and continuously withdrawing the mass comprising polymer catalyst, unreacted monomers and solvent from the top of the reactor. In the latter case the rate of addition of polar monomer is controlled in a manner similar to that practiced in a batch reaction.

The optimum specific reaction conditions will depend to some extent on the types of monomers and the proportions of reactants and catalyst components. The Group IIIb metal compound may be used for example in an amount of 10 to 160, preferably 20 to 60 moles per 1000 liters of solvent if a solvent is used. The Group Ia or IIb metal compound may be used in an amount of 0.1 to 3, preferably 0.3 to 1 mole per mole of Group IIIb metal compound. The amount of transition heavy metal oxidizing component may be for example in the range of 0.1 to 5 preferably 0.3 to 2 moles per mole of Group IIIb metal compound. If an inert polymerization solvent is employed, the concentration of catalyst in the solvent may be, for example, in the range of 1 to 15 gram moles of oxidizing component per 1000 liters of solvent. The temperature of polymerization may be, for example, in the range of 20 to 120° C. preferably 30 to 50° C. and the total pressure in the range of 100 to 500 p.s.i.g., preferably 150 to 400 p.s.i.g.

In carrying out the polymerization process of this invention it is particularly advantageous that the Group IIIb metal compound and the Group Ia or IIb metal compound be separately added to the polymerization reaction zone. In this way each catalyst component may be added to the reaction zone in the form of a liquid which is much more easily injected into the reactor from which atmospheric contaminants must be rigidly excluded than if the catalyst were in the form of a slurry. For example, the Group Ia or IIb metal compound e.g. lithium alkyl, may be added in its pure form or mixed with an organic solvent, e.g. a hydrocarbon solvent such as heptane, pentane, cyclohexane or benzene. If an organic solvent is used, it may be mixed with any proportion of Group Ia or IIb metal compound but preferably the latter will be present in a concentration of 10 to 50% by weight. Similarly the Group IIIb metal compound, e.g. aluminum trialkyl, may be used by itself or mixed in any proportion but preferably such that the solution contains 10 to 50% by weight of Group IIIb metal compound, with an organic solvent, e.g. a hydrocarbon solvent such as those mentioned above in connection with the addition of the Group Ia or IIb metal compound.

The transition heavy metal oxidizing component, e.g. titanium tetrachloride, may also be added to the reaction zone separately, or may be mixed with the Group IIIb metal compound solution or the Group Ia or IIb metal compound solution prior to its being injected into the reaction zone. It may also be used in its pure form or as a solution having any concentration but preferably 10 to 50% by weight of the oxidizing component in an inert organic which may be one of the same class which is suitable for use in the addition of the other catalyst components.

In accordance with still another aspect of the invention, control over the amount of polar monomer incorporated into the copolymer, if a copolymer of polar and hydrocarbon monomer is being prepared, is improved and/or the yield is raised by adding the polar comonomer to the reaction zone in the form of a complex with a compound which is a Lewis acid with respect to the polar comonomer. Some suitable Lewis acids are, for example, compounds of elements of Group IIIb of the Periodic Table (Mendeléeff) wherein said element is directly attached to a carbon atom, a halogen such as chlorine, bromine or iodine, and vanadium compounds. A preferred group of Lewis acids are the aluminum compounds e.g. organo-aluminum compounds such as aluminum aryls and alkyls, aluminum halides such as aluminum trichloride and vanadium halides such as vanadyl chloride. In the formation of a Lewis acidpolar monomer complex, a Lewis acid in an amount, for example, of 0.1 to 1 mole per mole of polar comonomer may suitably be mixed together, preferably in the form of a solution in an inert solvent. The formation of a complex rather than merely a mixture of the Lewis acid and the polar monomer is indicated by the infrared absorption spectrum of the material which is unique and substantially different from the sums of the spectra of the individual compounds. Although the Lewis acid used in forming the complex may be the same as the reducing component of the catalyst, it does not take the place of such components. This is indicated by the fact that if a reducing component such as aluminum trialkyl is omitted from the catalyst and a complex of the aluminum trialkyl and the polar comonomer, is utilized, little or no polymerization will take place.

The process of this invention is capable of yielding polymers of particularly desirable characteristics. For example, polymers may be obtained having an inherent viscosity above 1 or 2 measured from a dilute solution of the polymer in tetrahydronaphthalene at 130° C., a substantial degree of linearity indicated by the presence, as determined by infra-red analysis, of no greater than 0.4 methyl group, preferably no greater than 0.2 methyl group per 100 carbon atoms more than the number of methyl groups per 100 carbon atoms of a theoretically completely linear polymer of the same monomeric units, and a substantial degree of crystallinity as indicated by the sharpness of the X-ray diffraction diagrams yielded by the polymers. Moreover, copolymers of ethylene and a polar comonomer such as methyl methacrylate may be obtained having a crystalline melting point of at least 123° C., while copolymers of propylene and a polar comonomer may be obtained having a crystalline melting point of at least 156° C.

The following examples further illustrate this invention.

*Example I*

Into a reaction vessel fitted with stirrer and previously flushed with nitrogen were introduced 20 liters of toluene and, in the described sequence, 0.7 mole of titanium tetrachloride, 1.5 moles of aluminum triisobutyl, and 1.5 moles of lithium n-butyl. The vessel was sealed and hydrogen was introduced with stirring until the total pressure reached 20 p.s.i.g., and the temperature in the vessel was adjusted to 105° F. Ethylene was then fed into the vessel until the total pressure reached 400 p.s.i.g. Simultaneously, the gradual injection of 2000 ml. of methyl methacrylate into the vessel was begun at a uniform rate and the addition was complete after 3½ hours. The rate of addition of methyl methacrylate was thus about 0.13 millimole per millimole of titanium tetrachloride per minute. The reaction was then stopped by depressurizing the vessel and discharging the mass into a small quantity of methanol. The polymer was separated by mixing the mass with a sufficient amount of methanol containing 5% hydrochloric acid to cause precipitation of the polymer, filtering, soaking the polymer in deionized water, washing with an additional quantity of methanol and drying at 50° C. under vacuum. A yield of 500 grams of copolymer containing 17% by weight of combined methyl methacrylate units was obtained. The polymer had an inherent viscosity of 4.4 and a crystalline melting point of 135° C., a flow point of 210° C. and yielded an extremely sharp X-ray diffraction diagram.

The copolymer of this example was melt spun into a filament of very good mechanical properties.

*Example II*

The procedure of Example I was repeated except that the solvent was 2 liters of toluene, the catalyst was composed of 80 millimoles of titanium tetrachloride, 160 millimiles of triisobutyl aluminum, and 160 millimoles of lithium n-butyl, and 200 ml. of methyl methacrylate were introduced with ethylene into the reaction vessel at a uniform rate over a period of 2 hours for a rate of addition of methyl methacrylate of about 0.20 millimole per millimole of titanium tetrachloride per minute. A yield of 109 grams of polymer was obtained having the same composition and properties as that obtained in Example I.

*Example III*

The procedure of Example II was repeated except that the catalyst was composed of 80 millimoles of titanium tetrachloride, 280 millimoles of triisobutyl aluminum, and 300 millimoles of lithium n-butyl, the reaction temperature was 135° F. and the reaction period was 1 hour during which time the solution of methyl methacrylate was added at a uniform rate, the rate of addition of methyl methacrylate thus being about 0.39 millimole per millimole of titanium tetrachloride per minute. A yield of 109 grams of polymer containing 30% by weight of methyl methacrylate units was obtained. The polymer had an inherent viscosity of 3.40, a crystalline melting point of 135° C. and a flow point of 210° C.

The following examples illustrate the copolymerization of propylene.

*Example IV*

The procedure of Example I was repeated except that the solvent was 300 ml. of heptane, the catalyst was composed of 20 millimoles of triisobutyl aluminum, 10 millimoles of lithium n-butyl and 10 millimoles of titanium tetrachloride added to the reaction vessel in that order, no hydrogen was used, the reaction temperature was 135° C., the hydrocarbon monomer was propylene, the total pressure was 100 p.s.i.g., and the methyl methacrylate was used in an amount of 10 ml. dissolved in 100 ml. of heptane which was added to the reaction vessel at a substantially uniform rate over the reaction period of 1 hour, for a rate of addition of methyl methacrylate of about 0.16 millimole per millimole of titanium tetrachloride per minute. A yield of 8 grams of polymer was obtained containing 16% by weight of combined methyl methacrylate. The polymer had an inherent viscosity of 2.74 and a crystalline melting point of 168° C.

*Example V*

The procedure of Example IV was repeated except that the methyl methacrylate was added in an amount of 5 ml. complexed with 50 millimoles of triisobutyl aluminum, the rate of addition of methyl methacrylate being thus about 0.08 millimole per millimole of titanium tetrachloride per minute. The yield was 11 grams of a copolymer containing 2% by weight of combined methyl methacrylate units and having an inherent viscosity of 3.1 and a crystalline melting point of 159–160° C.

*Example VI*

The procedure of Example V was repeated except that the 5 ml. of methyl methacrylate were complexed with 5 millimoles of vanadyl chloride, $VOCl_3$. A yield of 11 grams of polymer were obtained having a combined methyl methacrylate content of 3.2% by weight.

In addition to the copolymers of the above examples, linear, isotactic homopolymers of polar monomers, e.g. methyl methacrylate, may be obtained with the process of this invention, e.g., by using a molar excess of the Group Ia or IIb component such as a lithium alkyl over the Group IIIb component such as an aluminum trialkyl.

The copolymers obtained in each of the above examples were substantially linear as indicated by the fact that they each contained no greater than 0.2 methyl group per 100 carbon atoms more than the number of methyl groups per 100 carbon atoms which would be present in a theoretically completely linear polymer of the same monomeric units. Moreover, they each possessed a high degree of crystallinity as indicated by strong birefringence in polarized light and the yielding by the copolymer of a sharp X-ray diffraction pattern. The copolymers were compression molded into films of superior mechanical and optical properties which were useful, for example, as wrapping and protective coverings. They could also be formed into filaments of very good mechanical properties. Formation of the copolymers into shaped articles was comparatively easy due to their improved flow characteristics.

The flow points referred to above were determined by first melting the copolymer by slow heating (1° C. per minute above 150° C.) to droplet formation. The crsytalline melting point was determined by cooling the droplet to room temperature and in a second heating determining the temperature at which birefringence disappears using a Kofler hot stage microscope and polarized light with quarter wave length plate.

The inherent viscosities were determined from a solution of the polymer in tetrahydronaphthalene at 130° C., the concentration of the solution being 0.1 gram of polymer per deciliter of solvent.

The polar monomer content of the copolymers were determined by infra-red analysis using the CO absorption at 5.77 microns.

It is to be understood that the foregoing detailed description is given merely by way of illustration and that many variations may be made therein without departing from the spirit of my invention.

Having described my invention what I desire to secure by Letters Patent is:

1. A substantially linear copolymer of at least one monoethylenically unsaturated alpha olefin having from 2 to 8 carbon atoms and a monoethylenically unsaturated polar monomer selected from the group consisting of vinyl alkanoates having up to about 18 carbon atoms, and alkyl acrylates wherein said alkyl group has up to about 6 carbon atoms, said copolymer being the product resulting from a process comprising:

(A) gradually adding said polar monomer to a reaction zone comprising said alpha olefin and a catalyst system consisting essentially of
  (1) from about 10 to about 160 moles, per 1000 liters of reaction zone, of at least one compound of an element of Group IIIb of the Periodic Table (Mendeléeff), said compound being selected from the group consisting of the alkyls, aryls and alkyl halides;
  (2) from about 0.1 to about 5 moles, per mole of said component (1), of a compound of at least one element of Groups IVa, Va, VIa, VIIa and VIII of the Periodic Table (Mendeléeff), said compound being selected from the group consisting of the halides, oxyhydrocarbons, oxyhalides, and oxides, said element having a valence above its most reduced state; and
  (3) from about 0.1 to about 3 moles, per mole of said component (1) of a compound selected from the group consisting of lithium, sodium, potassium, beryllium and magnesium alkyls having up to about 6 carbon atoms,
said addition of polar monomer to said reaction zone being at a rate of between about 0.01 and 1.0 millimole per millimole of said catalyst component (2) per minute; and
(B) copolymerizing said monomers at a temperature between about 20° and 120° C. and a pressure between about 100 and 500 p.s.i.g.

2. A substantially linear copolymer of an alpha olefin having from 2 to 8 carbon atoms and from about 4 to about 12 mol percent of methyl methacrylate,
(A) said copolymer being prepared by gradually adding said methyl methacrylate to a reaction zone comprising said alpha olefin and a catalyst system consisting essentially of
  from about 10 to about 160 moles, per 1000 liters of reaction zone, of an aluminum alkyl,
  from about 0.1 to about 5 moles, per mole of aluminum alkyl, of a titanium halide, and
  from about 0.1 to about 3 moles, per mole of aluminum alkyl, of a lithium alkyl having up to about 6 carbon atoms,
said addition of methyl methacrylate to said reaction zone being at a rate of between about 0.01 and 1.0 millimole per millimole of titanium halide per minute; and
(B) copolymerizing said monomers at a temperature between about 20° and 120° C. and a pressure between about 100 and 500 p.s.i.g.

3. The copolymer of claim 1, wherein said polar monomer is vinyl acetate.

4. The copolymer of claim 1, wherein said alpha olefin is propylene.

5. The copolymer of claim 1, wherein said copolymer contains from 4 to 12 mol percent of polymerized methyl methacrylate.

6. A shaped article of the copolymer of claim 1.

7. A film of the copolymer of claim 1.

8. A filament of the copolymer of claim 1.

9. A process of copolymerizing an alpha olefin having from 2 to 8 carbon atoms with a monothylenically unsaturated polar monomer selected from the group consisting of vinyl alkanoates having up to about 18 carbon atoms, and alkyl acrylates wherein said alkyl group has up to about 6 carbon atoms comprising:
(A) gradually adding said polar monomer to a reaction zone comprising an alpha olefin having from 2 to 8 carbon atoms and a catalyst system consisting essentially of
  (1) from about 10 to about 160 moles per 1000 liters of reaction zone of at least one compound of an element of Group IIIb of the Periodic Table (Mendeléeff), said compound being selected from the group consisting of the alkyls, aryls and alkyl halides;
  (2) from about 0.1 to about 5 moles, per mole of said component (1), of a compound of at least one element of Groups IVa, Va, VIa, VIIa and VIII of the Periodic Table (Mendeléeff), said compound being selected from the group consisting of the halides, oxyhydrocarbons, oxyhalides and oxides, said element having a valence above its most reduced state, and
  (3) from about 0.1 to about 3 moles, per mole of said component (1) of a compound selected from the group consisting of lithium, sodium, potassium, beryllium and magnesium alkyls having up to about 6 carbon atoms,
said addition of polar monomer to said reaction zone being at a rate of between about 0.01 and 1.0 millimole per millimole of said catalyst component (2) per minute; and
(B) copolymerizing said monomers at a temperature between about 20° and 120° C. and a pressure between about 100 and 500 p.s.i.g.

10. A process of copolymerizing an alpha olefin having from 2 to 8 carbon atoms with a monoethylenically unsaturated polar monomer selected from the group consisting of alkyl acrylates, said alkyl groups having up to about 6 carbon atoms comprising:
(A) gradually adding said polar monomer to a reaction zone comprising said alpha olefin and a catalyst system consisting essentially of
  (1) from about 10 to about 160 moles, per 1000 liters of reaction zone, of an aluminum alkyl, wherein the alkyl groups contain up to about 6 carbon atoms,
  (2) from about 0.1 to about 5 moles, per mole of aluminum alkyl, of a compound selected from the group consisting of the halides, oxyhydrocarbons and oxyhalides of titanium, zirconium, vanadium and chromium, said metallic element having a valence above its most reduced state and
  (3) from about 0.1 to about 3 moles, per mole of aluminum alkyl, of a compound selected from the group consisting of lithium, sodium and potassium alkyls having up to about 6 carbon atoms;
said addition of polar monomer being at a rate of between about 0.01 and 1.0 millimole per millimole of catalyst component (2) per minute; and
(B) copolymerizing said monomers at a temperature of between about 20° C. and 120° C. and a pressure of between about 100 and 500 p.s.i.g.

References Cited by the Examiner

UNITED STATES PATENTS

| | | | |
|---|---|---|---|
| 2,200,429 | 5/1940 | Perrin et al. | 260—87.3 |
| 2,467,234 | 4/1949 | Sargent et al. | 260—87.3 |
| 2,947,735 | 8/1960 | Bartl | 260—87.3 |
| 3,029,230 | 4/1962 | Strauss | 260—87.3 |
| 3,089,897 | 5/1963 | Balmer et al. | 260—86.7 |
| 3,198,776 | 8/1965 | Miller et al. | 260—86.7 |

FOREIGN PATENTS

| | | |
|---|---|---|
| 802,633 | 10/1958 | Great Britain. |
| 835,466 | 5/1960 | Great Britain. |

JOSEPH L. SCHOFER, *Primary Examiner.*

H. WONG, *Assistant Examiner.*